United States Patent [19]
Hopper

[11] 3,871,160
[45] Mar. 18, 1975

[54] COMBINATION LAWN MOWER AND EDGER

[76] Inventor: Roy L. Hooper, 8 Highland Dr., Chickasha, Okla. 73018

[22] Filed: Sept. 20, 1973

[21] Appl. No.: 399,195

[52] U.S. Cl.................... 56/16.9, 56/17.1, 56/256
[51] Int. Cl............................................. A01d 35/12
[58] Field of Search ......... 56/13.7, 11.6, 16.9, 17.1, 56/256, 295

[56] References Cited
UNITED STATES PATENTS

| | | | |
|---|---|---|---|
| 2,862,344 | 12/1958 | Caudle et al............... | 56/16.9 |
| 3,193,996 | 7/1965 | Wellborn.................. | 56/256 |
| 3,279,159 | 10/1966 | Paul....................... | 56/295 |
| 3,686,839 | 8/1972 | Lambert................... | 56/16.9 |
| 3,693,334 | 5/1971 | Lowery.................... | 56/16.9 |

Primary Examiner—Louis G. Mancene
Assistant Examiner—J. Q. Lever
Attorney, Agent, or Firm—Clarence A. O'Brien; Harvey B. Jacobson

[57] ABSTRACT

An edger attachment for a powered lawn mower has a blade adjustably, rotatably mounted on the mower frame and rotated by a power take-off connected to the mower power source. The blade is mounted on the frame for vertical adjustment by a remote control assembly associated with the mower handle. The mower wheels arranged on a side of the frame opposite the side on which the blade is mounted each have a further wheel pivotally mounted thereon for leveling the mower frame on a curb, and the like, and a disk plate is mounted adjacent and associated with a wheel disposed on the same frame side as the blade for guiding the mower frame while edging. The blade is formed by a blade body constructed from a resilient material having a plurality of parallel wires embedded therein for reinforcing same.

6 Claims, 6 Drawing Figures

PATENTED MAR 18 1975

COMBINATION LAWN MOWER AND EDGER

BACKGROUND OF THE INVENTION

1. Field of the Invention

This invention relates generally to lawn-cutting devices, and particularly to an edging assembly combinable with a powered lawn mower.

2. Description of the Prior Art

It is known generally to combine an edging device with a lawn mower for facilitating lawn care by permitting simultaneous cutting, edging, and trimming operations. See, for example, U.S. Pat. Nos. 2,480,922, issued Sept. 6, 1949 to R. E. Harshman, U.S. Pat. No. 2,707,858, issued May 10, 1955 to L. R. Norton et al., U.S. Pat. No. 2,771,730, issued Nov. 27, 1956 to M. E. True, U.S. Pat. No. 3,183,652, issued May 18, 1965 to J. T. Pratt, and U.S. Pat. No. 3,192,693, issued July 6, 1965 to R. Bergeson. These prior art devices generally provide an edging attachment which is selectively attachable to a conventional lawn mower.

SUMMARY OF THE INVENTION

It is an object of the present invention to provide an improved edging attachment for a lawn mower.

It is another object of the present invention to provide a lawn mower edging assembly which permits level mowing and edging adjacent curbs and the like.

It is yet another object of the present invention to provide a flexible blade for a lawn mower edger attachment.

These and other objects are achieved according to the present invention by providing a lawn mower edger assembly having: a blade; an arrangement adjustably, rotatably mounting the blade on a mower frame; and power transmitting structure connected to the blade and a mower power source for rotating the blade. The specific construction of the mounting and rotating arrangements provides a system having optimum adjustability and ease of attachment to an associated lawn mower.

An advantageous feature of an edger attachment assembly according to the present invention is the provision of a pair of leveling wheels pivotally connected to associated wheels on a side of the mower frame opposite the side upon which the blade is disposed for leveling the mower frame on a curb and the like.

An edging blade particularly for an edging attachment according to the present invention is preferably constructed from a resilient material having a plurality of parallel wires embedded therein for reinforcing same.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
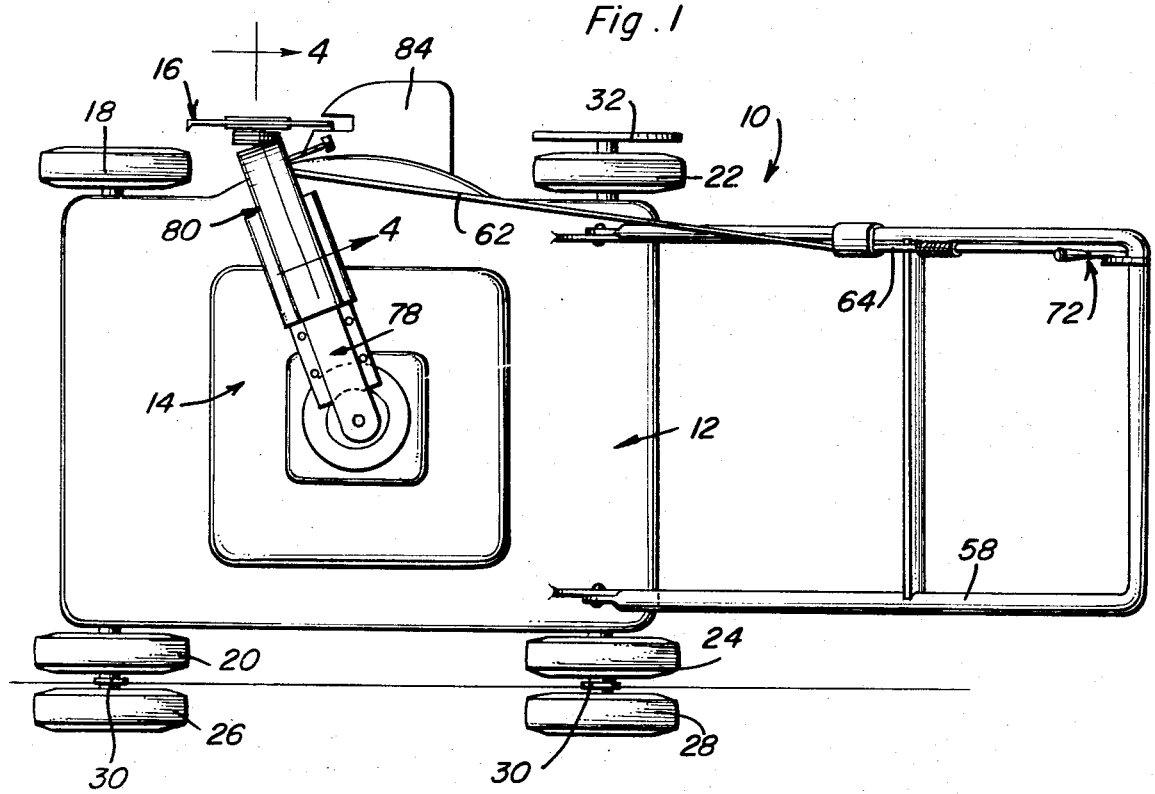
FIG. 1 is a top plan view showing a powered lawn mower provided with an edging attachment assembly according to the present invention.
Figure 2:
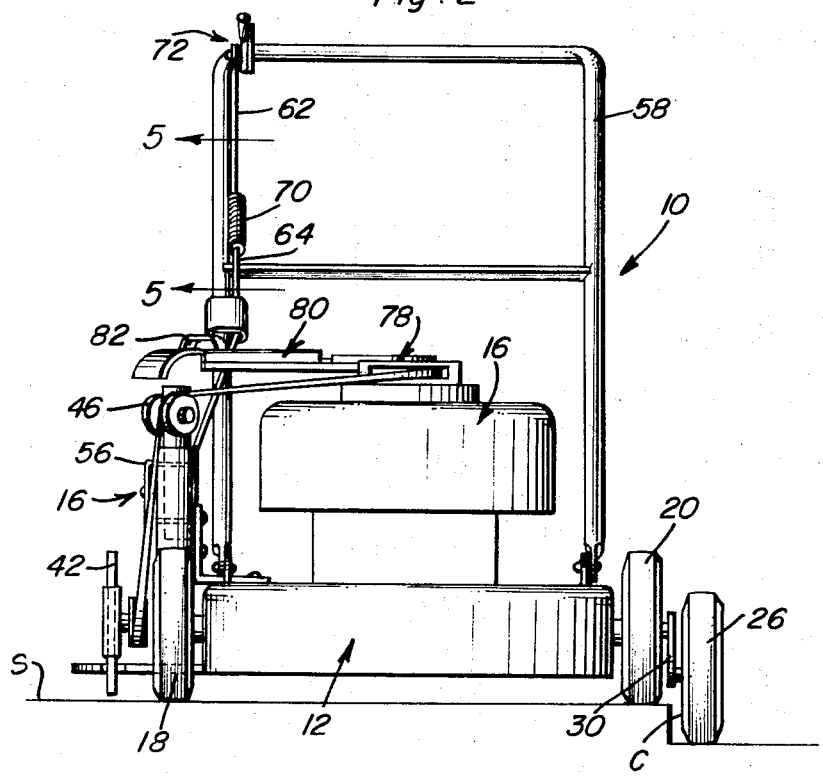
FIG. 2 is a partly schematic front elevational view showing the lawn mower and edging attachment assembly of FIG. 1.
Figure 3:
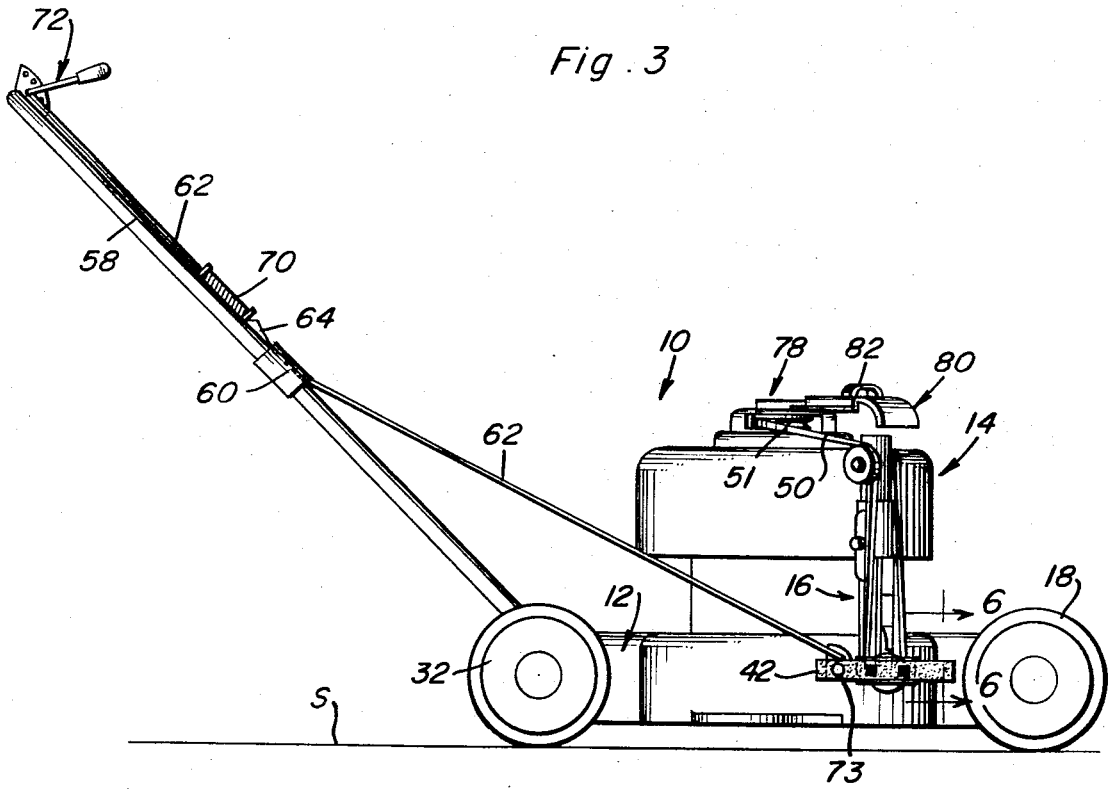
FIG. 3 is a side elevational view showing the lawn mower and edging attachment assembly of FIGS. 1 and 2.

Referring now more particularly to FIGS. 1 to 3 of the drawings, a powered lawn mower 10 of a conventional nature has a frame 12 on which is mounted a suitable power source 14, such as a gasoline or electric motor. An edger assembly is shown attached to frame 12 for actuation by power source 14. A preferred construction of assembly 16 and its disposition with respect to frame 12 will be discussed in greater detail below.

Mower 10 has two pairs of wheels 18, 20 and 22, 24 mounted thereon, each wheel of a pair being disposed on a side of frame 12 opposite to a side of the frame 12 where the other wheel of the pair is disposed. Assembly 16 includes a pair of further wheels 26 and 28 associated with the wheels 20 and 24 arranged on the side of the frame opposite wheels 18 and 20. Each of these further wheels 26 and 28 is pivotally connected in a suitable, known manner to the wheels 20, 24 associated with same and are arrangeable for leveling frame 12 on a curb C, and the like. The mounting of wheels 26 and 28 is advantageously achieved as by a bracket 30 pivotally mounted to an axle mounting the associated wheels 20 and 24, and rotatably mounting wheels 26 and 28. A disk plate 32 is mounted adjacent and associated with wheel 22, and is arranged for guiding frame 12 while edging operations are being performed.

Figure 4:
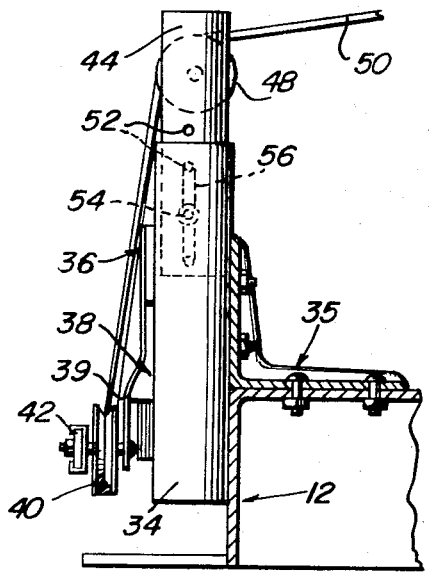
FIG. 4 is a fragmentary, sectional view taken generally along the line 4—4 of FIG. 1.

A mounting arrangement forming a part of assembly 16 includes a sleeve 34 connected to frame 12 as by an angle-bracket 35, as can best be seen from FIG. 4 of the drawings. A holder 36 in the form of a plate having peripheral guide channel portions is mounted on cylindrical sleeve 34 in a suitable manner, such as with the illustrated screw fasteners. An adjustment bracket 38 is adjustably arranged on holder 36 as by being received in the peripheral guide channels of the latter. A cantilevered portion 39 of bracket 38 permits the rotatable mounting of a drive element 40, in the form of a conventional pulley, on bracket 38. A blade 42, to be described in more detail below, is mounted on the same shaft as element 40 for rotation thereby. A stem 44 is adjustably mounted on sleeve 34 and rotatably mounts a pair of idler pulleys 46 and 48. A conventional power transmission belt 50 is arranged about pulleys 46 and 48, drive element 40, and a pulley 51 associated with power source 14 for transmitting torque from power source 14 to drive element 40. Pulley 51 is best seen in FIG. 3 of the drawings. A plurality of apertures 52 are provided in sleeve 34 and are arranged for selectively receiving a pin 54 associated with and mounted on stem 44 as by a U-shaped bracket 56 for permitting adjustment of stem 44 with respect to sleeve 34. As can be readily appreciated from FIG. 4 of the drawings, adjustment of stem 44 with respect to sleeve 34 will permit adjustment of the tension on belt 50. Adjustment of bracket 38 in holder 36 will also achieve such a tension adjustment, and this adjustment is controlled in a manner to be discussed below.

Figure 5:
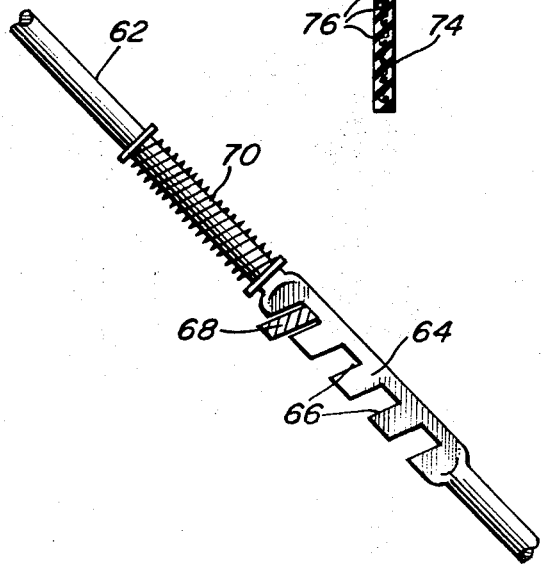
FIG. 5 is a fragmentary, sectional view taken generally along the line 5—5 of FIG. 2.

Referring now to FIG. 5 of the drawings, mower 10 is additionally provided with a handle 58 (FIGS. 1 to 3 of the drawings). A guide clamp 60 is mounted on handle 58, while a longitudinal rod 62 is arranged passing through clamp 60 for longitudinal movement with respect thereto and is connected to adjustment bracket 38 at one longitudinal end of rod 62 for positioning bracket 38 relative to holder 36. A portion 64 or rod 62 is provided with a plurality of grooves or dogs 66 arranged for selectively engaging with a brace 68 forming a part of handle 58 and adjustably retaining rod 62 with respect to handle 58. Rod 62 is biased relative to clamp 60 by a conventional coiled spring 70 having washers provided at either end thereof, the washer spaced farther from clamp 60 being anchored to rod 62 in a suitable manner, such as by a cotter pin (not shown). It will be appreciated that spring 70 will only abut clamp 60 when mower handle 58 is in a lowered position (not shown). A lever assembly 72 is provided on handle 58 and is attached to the end of rod 62 spaced from the end attached to bracket 38 for facilitating positioning of rod 62 relative to brace 68. Thus, while adjustment of dog 66 with respect to brace 68 will determine the rotational velocity and power of blade 42, raising and lowering handle 58 will engage and disengage, respectively, edger assembly 16 by moving bracket 38 in holder 36 and tensioning and releasing belt 50. Further, the edger assembly 16 may be disengaged as by removing pin 73 and detaching rod 62 from bracket 38.

As can be readily understood from the drawings and from the above description, edging can be accomplished with an assembly 16 in accordance with the present invention by pulling a mower 10 backward or forward. Any time handle 58 is lowered, edger assembly 16 is automatically shut off. This feature is especially desirable for reasons of safety. The use of a mower 10 provided with assembly 16 along a curb C adjacent a surface S is facilitated by the wheels 26 and 28 as is best shown in FIG. 2 of the drawings. Since bracket 30 is fixed to the non-rotating axles upon which wheels 20 and 24 are mounted, positioning of the axles relative to frame 12 will determine the height of wheels 26 and 28. Thus, wheels 26 and 28 will engage a supporting surface even if wheels 20 and 24 are moved off of supporting surface S.

Figure 6:
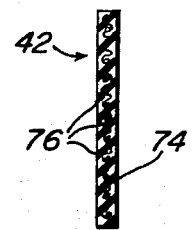
FIG. 6 is a fragmentary, sectional, detail view taken generally along the line 6—6 of FIG. 3.

A blade 42 according to the present invention may be made of metal, specially if the ground being edged is hard and must be initially softened. The construction of a blade 42 ideally suited for general use with an assembly 16 according to the present invention, is illustrated in section in FIG. 6 of the drawings. This blade 42 has a body 74 constructed from a resilient material, such as a natural or synthetic rubber, and has a plurality of parallel wires 76 embedded in this resilient material for reinforcing same. As blade 42 wears down, the wheels 18, 20, 22, and 24 of mower 10 may be adjusted to compensate for the blade wear. Blade 42 may be tilted along its mounting shaft in a manner not shown so as to facilitate cutting along fences and building foundations.

A cover 78 is advantageously arranged over pulley 51 and belt 50, and includes a guard which extends out over stem 44 and pulleys 46 and 48. A handle 82 on guard 80 facilitates manipulation of same. A housing 84 is advantageously arranged shrouding the exit opening of frame 12 for guiding the grass cuttings, and the like, away from blade 42 of assembly 16.

As can be readily appreciated from the drawings and the above description, an edger assembly 16 according to the present invention provides a lawn mower attachment which is substantially trouble free and inexpensive to construct and operate. Further, a resilient blade 42 permits continued operation of the edger while passing a mower 10 over concrete slabs, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a powered lawn mower having a frame and a power source, an edger assembly, comprising, in combination:
    a. a blade;
    b. means for adjustably, rotatably mounting the blade on the mower frame, the means for adjustably, rotatably mounting the blade including a sleeve affixed on the frame, a holder provided on the sleeve, an adjustment bracket adjustably arranged on the holder, a drive element connected to the adjustment bracket, the drive element is a pulley rotatably mounted on the adjustment bracket, and the blade connected to the drive element for rotation thereby; and
    c. means connected to the blade and mower power source for rotating the blade, the means for rotating the blade including a stem adjustably mounted on the sleeve, a pair of idler pulleys rotatably mounted on the stem, and a belt arranged engaging the pulleys and with a pulley associated with the power source for transmitting torque from the power source to the pulley forming the drive element.

2. A structure as defined in claim 1, wherein the mower additionally has a handle, and the means for rotating the blade further includes a guide clamp mounted on the handle, a longitudinal rod arranged passing through the guide clamp for longitudinal movement with respect thereto and connected to the adjustment bracket for positioning same relative to the holder, and means associated with the rod for adjustably retaining same with respect to the handle.

3. A structure as defined in claim 2, wherein the mower additionally has two pairs of wheels mounted thereon, each wheel of a pair being disposed on a side of the frame opposite to a side of the frame where the other wheel of the pair is disposed, with the blade being mounted adjacent a one of the wheels of a pair, and wherein the edger assembly further includes a pair of further wheels associated with the wheels disposed on the side of the frame opposite the one of the wheels, each of the further wheels affixed to a non-rotating axle associated with the further wheel and arrangeable for leveling the mower frame on a curb, and a disk plate mounted adjacent and associated with the other wheel disposed on the same frame side as the one of the wheels and arranged for guiding the mower frame while edging.

4. A structure as defined in claim 3, wherein the blade comprises a blade body constructed from a resilient material, and a plurality of parallel wires embedded in the resilient material for reinforcing same.

5. A structure as defined in claim 1 wherein the mower additionally has two pairs of wheels mounted thereon, each wheel of a pair being disposed on a side of the frame opposite to a side of the frame where the wheel of the pair is disposed, with the blade being mounted adjacent a one of the wheels of a pair, and wherein the edger assembly further includes a pair of further wheels associated with the wheels disposed on the side of the frame opposite the one of the wheels, each of the further wheels affixed to a non-rotating axle associated with the further wheel and arrangeable for leveling the mower frame on a curb, and a disk plate mounted adjacent and associated with the other wheel disposed on the same frame side as the one of the wheels and arranged for guiding the mower frame while edging.

6. A structure as defined in claim 1, wherein the blade comprises a blade body constructed from a resilient material, and a plurality of parallel wires embedded in the resilient material for reinforcing same.

* * * * *